(12) United States Patent
Farmer (10) Patent No.: US 7,652,389 B2
(45) Date of Patent: Jan. 26, 2010

(54) AIR-WIND POWER SYSTEM FOR A VEHICLE

(76) Inventor: Clint Farmer, HC 62 Box 3335, Pittsburg, OK (US) 74560

(*) Notice: Subject to any disclaimer, the term of this patent is extended or adjusted under 35 U.S.C. 154(b) by 245 days.

(21) Appl. No.: 11/786,563

(22) Filed: Apr. 12, 2007

(65) Prior Publication Data

US 2008/0231052 A1 Sep. 25, 2008

Related U.S. Application Data

(63) Continuation-in-part of application No. 11/474,750, filed on Jun. 26, 2006, now abandoned.

(51) Int. Cl.
*F02B 63/04* (2006.01)
*H02P 9/04* (2006.01)

(52) U.S. Cl. ........................ 290/55; 290/1 R (58) Field of Classification Search ............... 290/44, 290/55, 1 R; 180/2.1, 2.2
See application file for complete search history.

(56) References Cited

U.S. PATENT DOCUMENTS

| | | | | |
|---|---|---|---|---|
| 3,556,239 A | * | 1/1971 | Spahn | 180/65.2 |
| 3,713,503 A | * | 1/1973 | Haan | 180/2.2 |
| 4,002,218 A | * | 1/1977 | Horvat | 180/2.2 |
| 4,075,545 A | * | 2/1978 | Haberer | 322/35 |
| 4,093,035 A | * | 6/1978 | Fletcher | 180/2.2 |
| 4,141,425 A | * | 2/1979 | Treat | 180/2.2 |
| 4,254,843 A | * | 3/1981 | Han et al. | 180/165 |
| 4,424,452 A | * | 1/1984 | Francis | 290/55 |
| 5,038,049 A | * | 8/1991 | Kato | 290/55 |
| 5,280,827 A | * | 1/1994 | Taylor et al. | 180/165 |
| 5,287,004 A | * | 2/1994 | Finley | 290/55 |
| 5,296,746 A | * | 3/1994 | Burkhardt | 290/55 |
| 5,986,249 A | | 11/1999 | Yoshino et al. | |
| 6,138,781 A | | 10/2000 | Hakala | |
| 6,255,804 B1 | | 7/2001 | Herniter et al. | |
| 6,261,138 B1 | | 7/2001 | Imura | |
| 6,497,593 B1 | * | 12/2002 | Willis | 440/8 |
| 6,700,215 B2 | * | 3/2004 | Wu | 290/44 |
| 6,897,575 B1 | * | 5/2005 | Yu | 290/44 |
| 7,434,636 B2 | * | 10/2008 | Sutherland | 180/2.2 |
| 7,445,064 B2 | * | 11/2008 | Kim | 180/2.2 |
| 2001/0011825 A1 | * | 8/2001 | de Vega | 290/55 |
| 2003/0052487 A1 | * | 3/2003 | Weingarten | 290/54 |
| 2005/0046195 A1 | * | 3/2005 | Kousoulis | 290/44 |

* cited by examiner

*Primary Examiner*—Julio Gonzalez
(74) *Attorney, Agent, or Firm*—James Ray & Assoc.

(57) ABSTRACT

The present invention provides an air-wind power system for a vehicle having an electrically operable drive system. The system includes at least one battery which is mounted within an interior portion of such vehicle and which is connected to such drive system and at least one air-wind powered turbine which is mounted on the vehicle and which is electrically coupled to the at least one battery. The air-wind powered turbine has a propeller fixed in a vertical plane and mounted on a horizontally disposed shaft having an axis thereof being disposed perpendicular to a longitudinal axis of such vehicle. A rotational movement of the propeller caused by an air current enables the at least one turbine to generate an electric energy which is stored in the at least one battery and which is used by such drive system to move such vehicle in a direction of travel.

8 Claims, 9 Drawing Sheets

AIR-WIND POWER SYSTEM FOR A VEHICLE

CROSS REFERENCE TO RELATED APPLICATIONS

This application is a Continuation-In-Part (CIP) of the U.S. Utility patent application Ser. No. 11/474,750 filed on Jun. 26, 2006 now abandoned.

FIELD OF INVENTION

The present invention relates, in general, to a power system for vehicles and, more particularly, this invention relates to an air-wind power system for a vehicle which employs an air-wind operated turbine for generating electrical energy.

BACKGROUND OF THE INVENTION

As is generally known, vehicles for private, commercial and military either run on petroleum or coal products or on a combination of petroleum products and electric energy. The electric energy is generally used only on land vehicles wherein it can be generated of by rotating wheels. Thus, undesirable vehicle emissions associated with the use of petroleum or coal products continue to be a worldwide problem.

Prior to the present invention, efforts have been made to eliminate use of petroleum or coal products. U.S. Pat. No. 6,497,593 issued to Willis and U.S. Pat. No. 6,261,138 issued to Imura discloses the use of conventional air-wind turbines for vehicles. The turbine includes a propeller mounted on a rotating rotor having an axis thereof disposed coaxially with the longitudinal axis of the vehicle or coaxially with the direction of travel. However, such positioning of the propeller perpendicular to the direction of travel does not effectively utilize the wind power available during motion of such vehicle. Furthermore, the prior art does not disclose the use of a battery for storing the generated electric energy; it is basically the air-wind powered vehicle that operates solely on the air-wind power.

SUMMARY OF THE INVENTION

In a first aspect, the present invention provides, in combination with a vehicle having an electrically operable drive means, an air-wind power system. The air-wind power system includes at least one battery which is mounted within such vehicle and which is connected to such drive means. At least one air-wind powered turbine is mounted on such vehicle and is electrically coupled to the at least one battery. The at least one air-powered turbine has a propeller which is fixed in a vertical plane and which is mounted on a horizontally disposed shaft having an axis thereof being disposed perpendicular to a longitudinal axis of such vehicle. A rotational movement of the propeller caused by an air current enables the at least one air-wind powered turbine to generate an electric energy which is stored in the at least one battery and which is used by such drive means to move such vehicle in a direction of travel.

In a further aspect, the present invention provides, in combination with a vehicle, an air-wind power system. The system includes an electric motor which is positioned adjacent one of a rear portion and a final drive system of such vehicle. At least one battery is mounted within such vehicle and is connected to the electric motor. At least one air-wind powered turbine is mounted on such vehicle and is electrically coupled to the at least one battery for generating an electric energy which is stored in the at least one battery and which is used by the electric motor to move such vehicle in a direction of travel.

OBJECTS OF THE INVENTION

It is therefore a primary object of the present invention to provide a system for a vehicle that could operate solely on low cost or free air-wind power.

It is a further object of the present invention to minimize operating costs as a result of eliminating the need for costly petroleum fuels that typically operate an internal combustion engine.

Still a further object of the present invention is to eliminate the fuel emission problem associated with operation of such internal combustion engine.

Another object of the present invention is to provide an air-wind power system which is capable of storing excess generated electric energy.

Yet another object of the present invention is to provide an air-wind power system which is connected to the national electric grid system for returning unused generated electric energy.

An additional object of the present invention is to provide an air-wind power system which is simple to manufacture.

In addition to the various objects of the invention that have been described above, various other objects and advantages will become more readily apparent to those persons skilled in the relevant art from the following more detailed description of the invention, particularly, when such description is taken in conjunction with the attached drawing figures and the appended claims.

BRIEF DESCRIPTION OF A PRESENTLY PREFERRED AND VARIOUS ALTERNATIVE EMBODIMENTS OF THE PRESENT INVENTION

Prior to proceeding to a more detailed description of the invention, it should be noted that identical components having identical functions have been designated with identical reference numerals for the sake of clarity.

Now refer more particularly to FIGS. 1 through 10 of the drawings. Illustrated therein is an air-wind power system, generally designated 8, which is usable on a vehicle. The system 8 includes a turbine, generally designated 10, which is conventionally constructed. Briefly, the turbine 10 includes a rotor 12 which has a propeller 14, preferably formed by a plurality of blades 16, and which is attached to a proximal end of a mast 18. A distal end of the mast 18 is rigidly attached to the vehicle.

As it well known in the art, air-wind current causes the rotation of the propeller 14 and subsequently causes rotation of the rotor 12 which enables the turbine 10 to generate electric energy through a generator 19 positioned inside the rotor 12.

The turbine 10 is electrically coupled to the at least one battery 20 positioned within the vehicle. As it is well known in the art, such at least one battery 20 is capable of storing electric energy generated by the turbine 10. The at least one battery 20 is in turn electrically coupled to a propulsion drive system 22. Such propulsion drive system 22 employs an electric motor 24 which uses the generated or stored energy to move the vehicle in a direction of travel. The electric motor 24 is positioned adjacent a rear drive 23 of such vehicle or a final phase of its drive system 22.

It has been found advantageous to fix the propeller 14 in a vertical plane by mounting it on a horizontally disposed shaft further having an axis thereof being disposed perpendicular to a longitudinal axis of such vehicle or to the direction of travel. In such arrangement, due to aerodynamics of the moving vehicle, the air current is directed onto the blades 16 and perpendicular to the rotational axis of the propeller 14 enabling its rotation and, more particularly, enabling generation of the electric energy. The generated electric energy is stored within the at least one battery 20 and is then drawn by the propulsion drive system 22 and, more particularly, by the electric motor 24. It can be appreciated that a plurality of batteries 20 electrically coupled therebetween into a battery storage system enables storing the excess electric energy during the vehicle's motion which then can be drawn by the electric motor 24 when little of no air wind currents are present. Such arrangement further eliminates the need for complex and expensive positioning means to incrementally position the blades 16 in the direction of air wind currents which are known in the art.

Furthermore, a plurality of turbines 10 may be employed in the present invention to generate a predetermined amount of electric energy.

The system 8 may further include an inverter means 26 for connecting the turbine 10 or optionally the at least one battery 20, to an electrical grid 28 in a conventional manner. In the present invention, the term vehicle is generally directed to any land, water or air type vehicle including but not limited to a passenger automobile, cargo transport vehicle, military vehicle, watercraft, cycle, mobile cart, wheelchair, stroller, aircraft, and locomotive.

Figure 1:
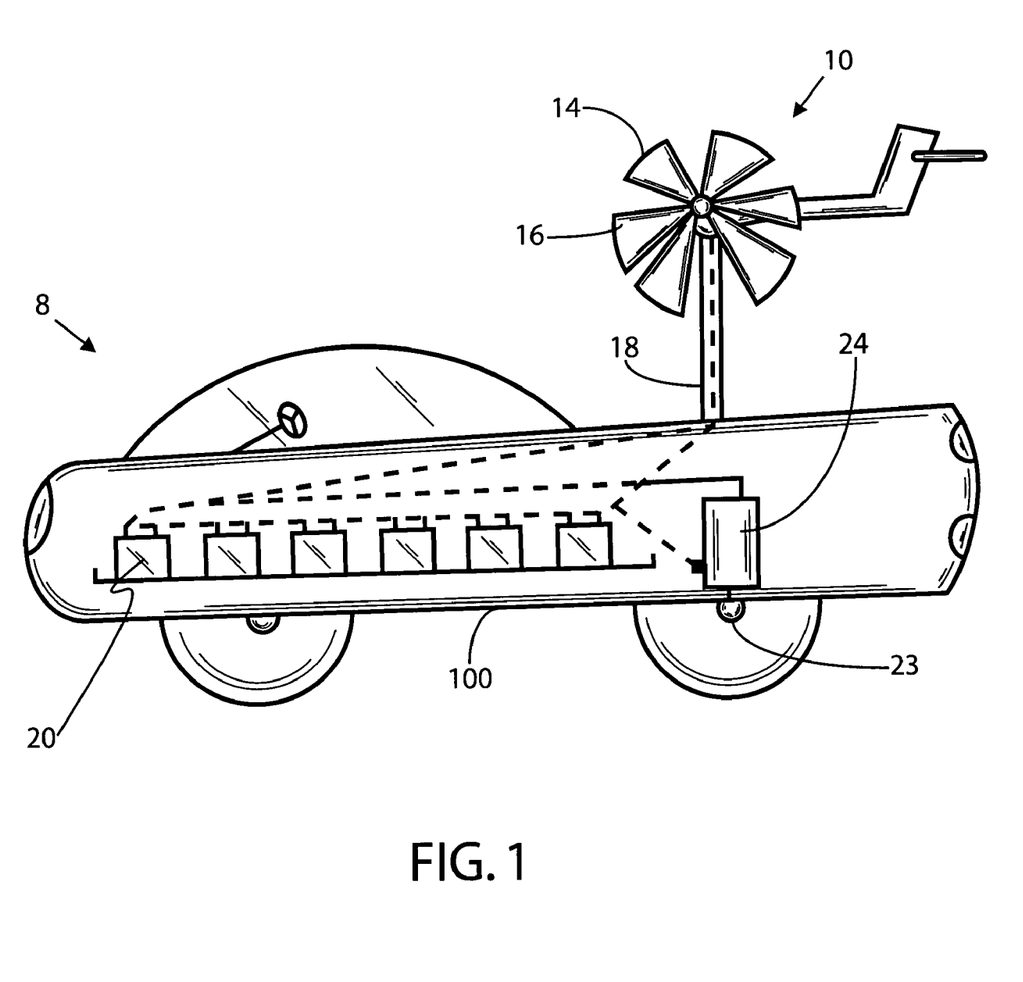
FIG. 1 is a schematic representation of an air-wind power system of the present invention shown in use on a passenger type automobile.
Figure 2:
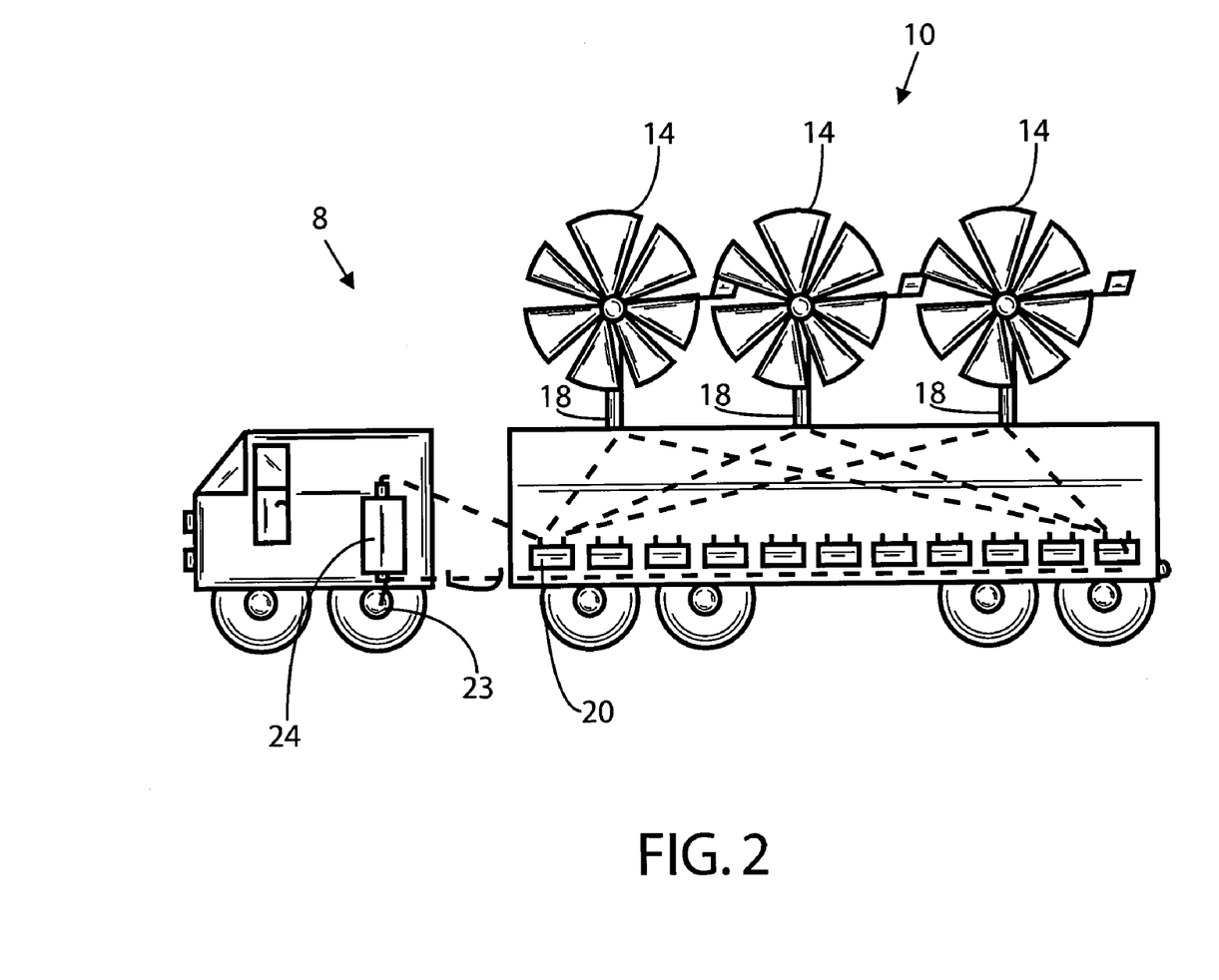
FIG. 2 is a schematic representation of an air-wind power system of the present invention shown in use on a semi-tractor trailer.
Figure 3:
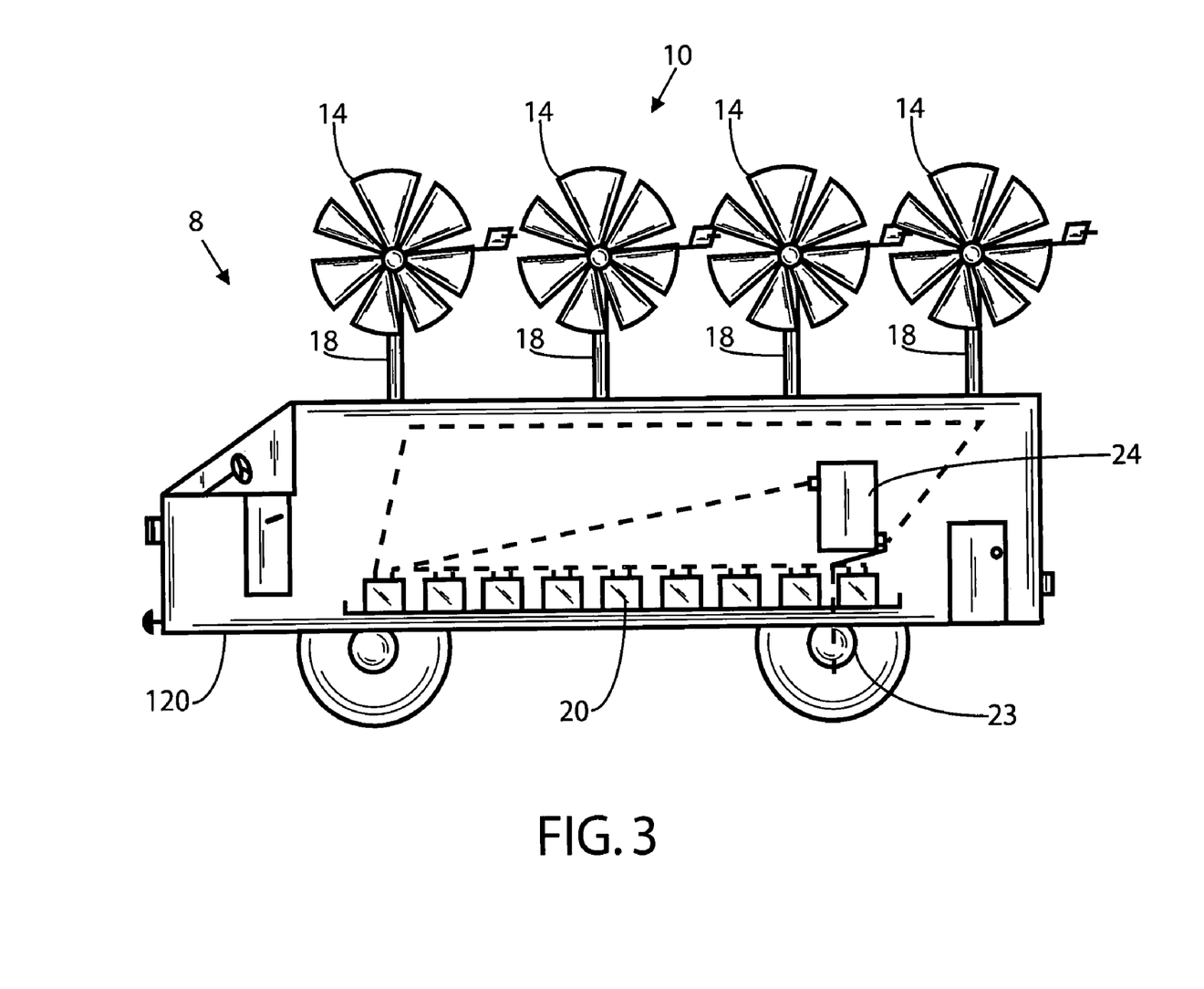
FIG. 3 is a schematic representation of an air-wind power system of the present invention shown in use on a recreational vehicle.
Figure 4:
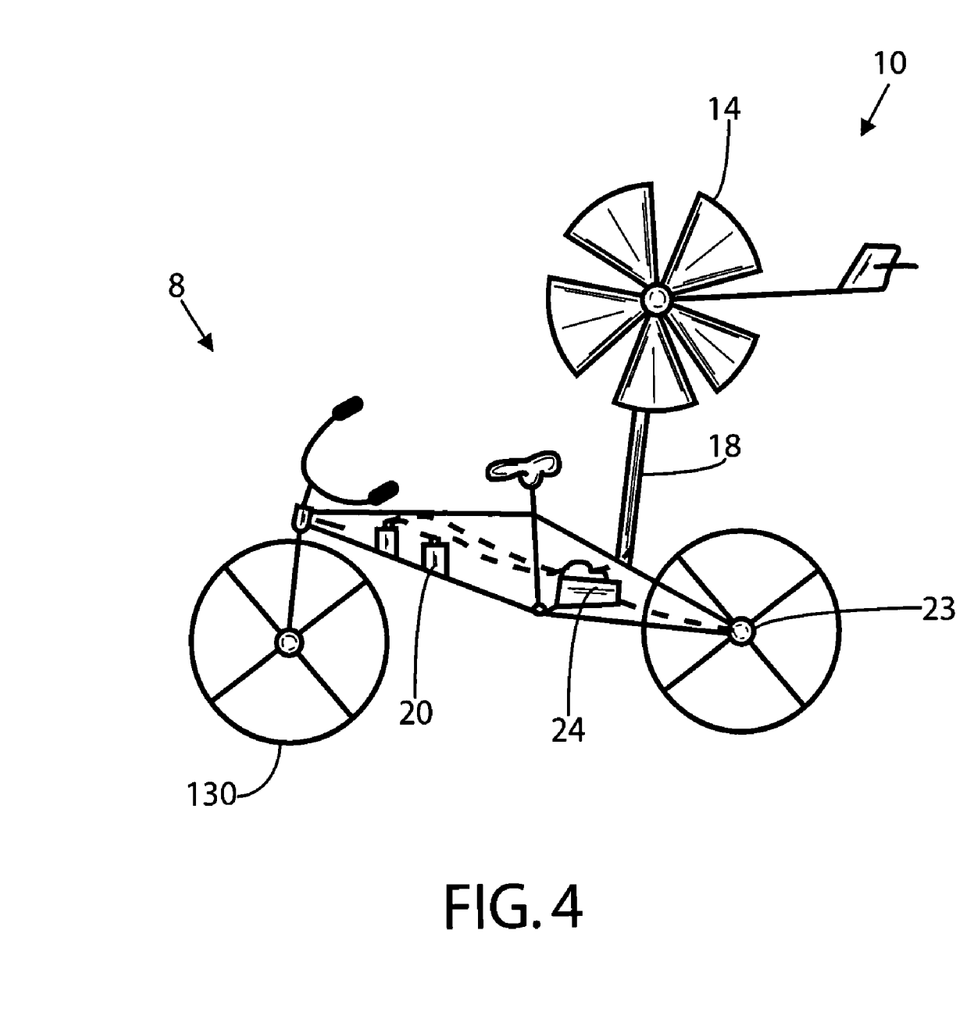
FIG. 4 is a schematic representation of an air-wind power system of the present invention shown in use on a bicycle.
Figure 5:
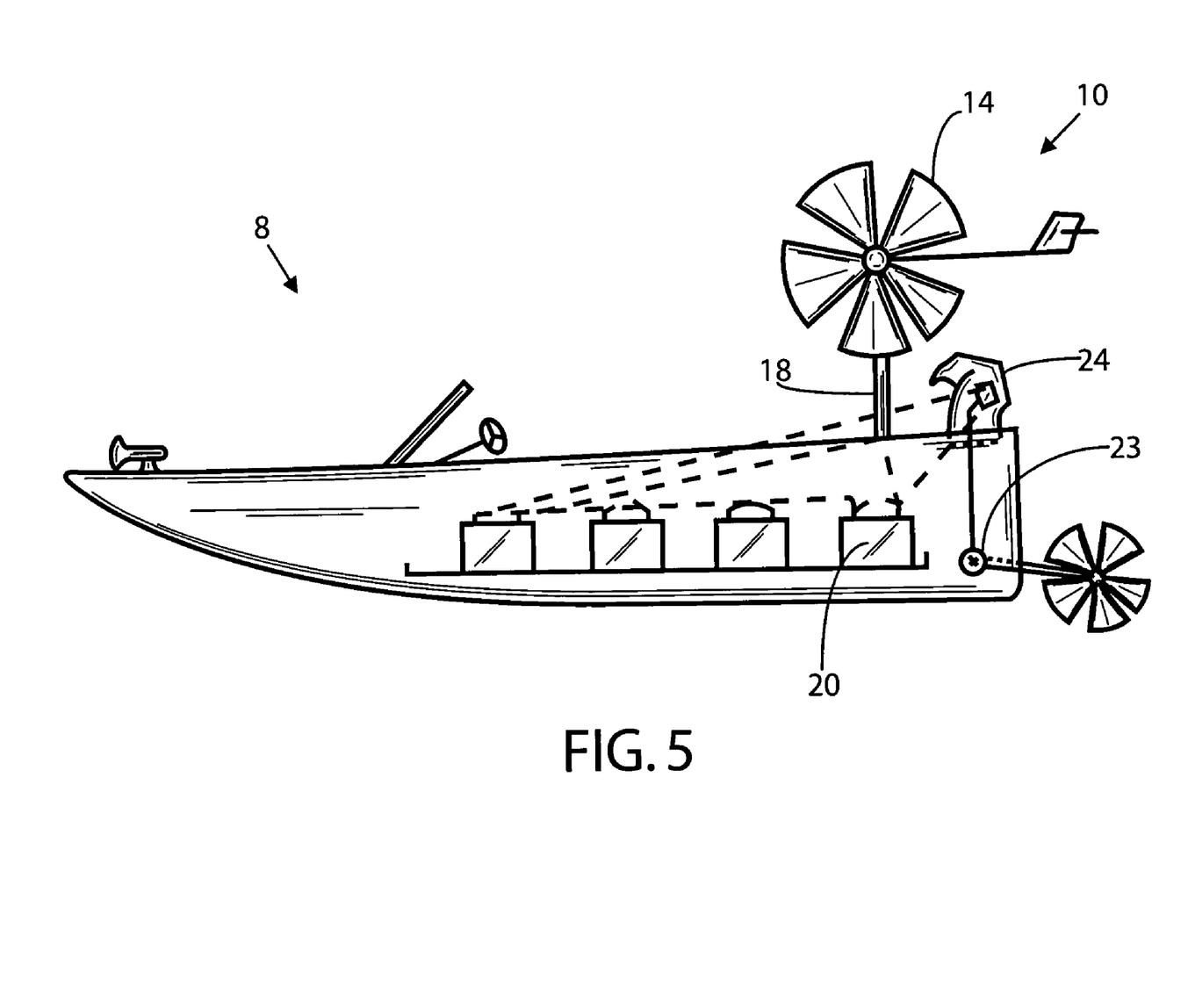
FIG. 5 is a schematic representation of an air-wind power system of the present invention shown in use on a watercraft.
Figure 6:
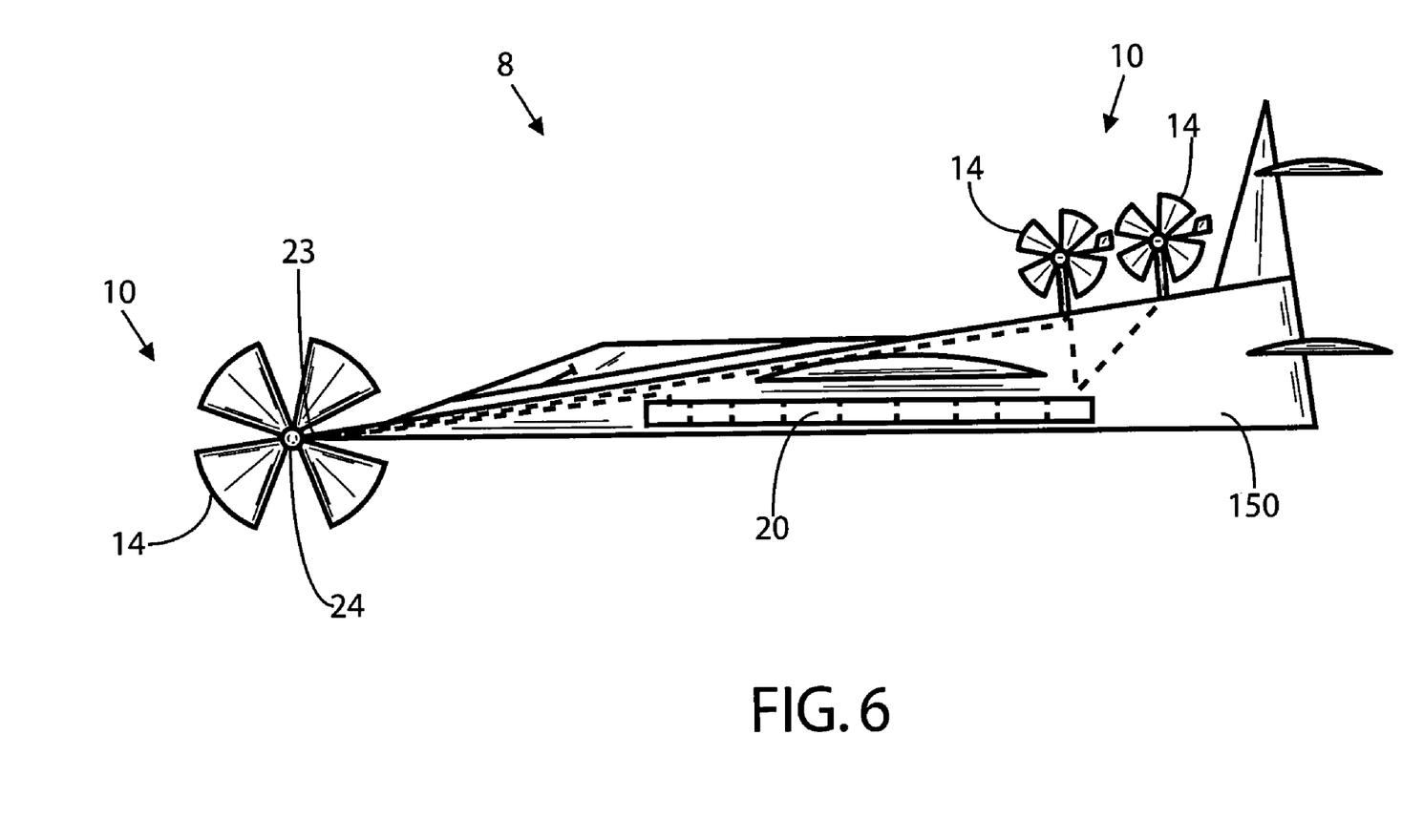
FIG. 6 is a schematic representation of an air-wind power system of the present invention shown in use on an airplane.
Figure 7:
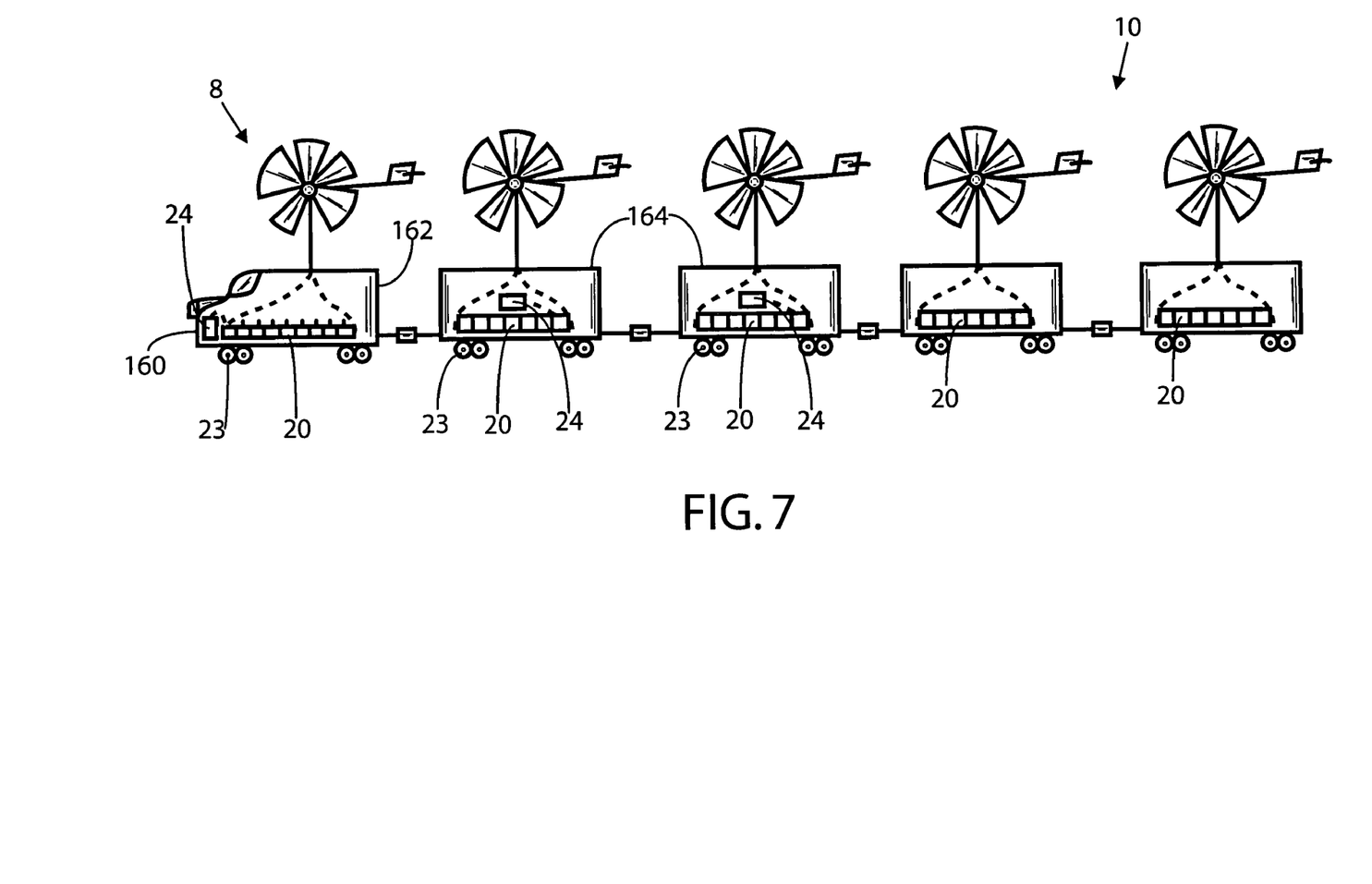
FIG. 7 is a schematic representation of an air-wind power system of the present invention shown in use on a train.
Figure 8:
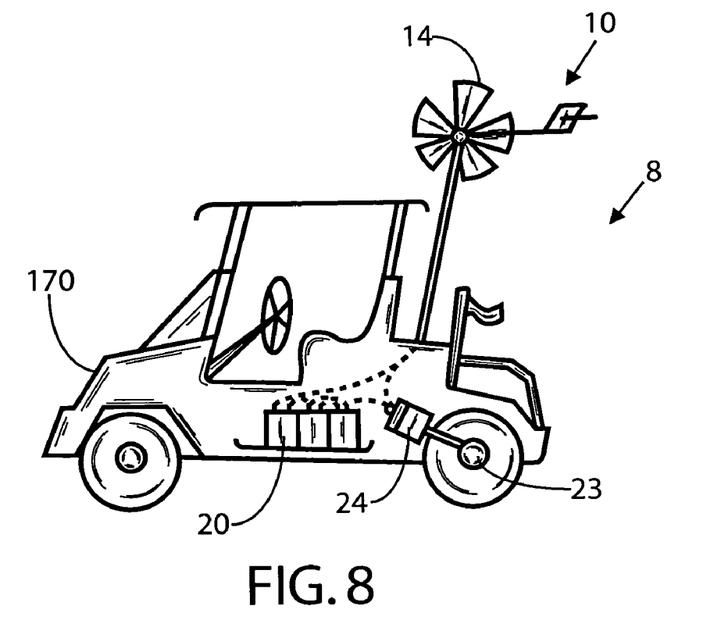
FIG. 8 is a schematic representation of an air-wind power system of the present invention shown in use on a golf cart.
Figure 9:
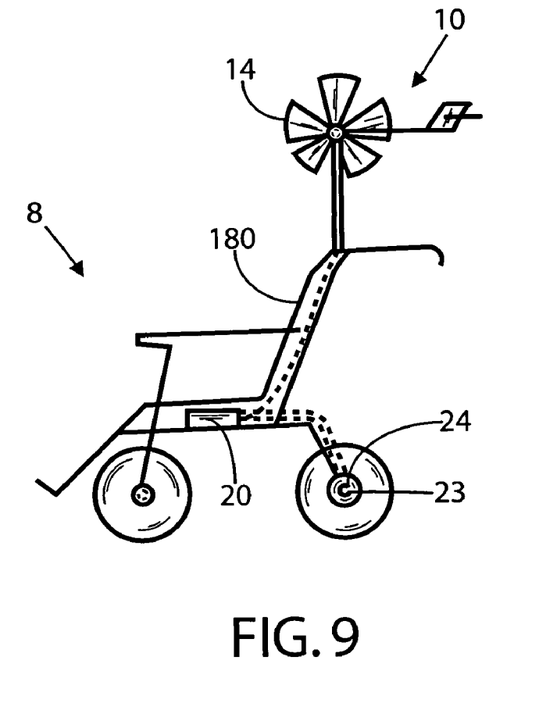
FIG. 9 is a schematic representation of an air-wind power system of the present invention shown in use on a baby stroller.
Figure 10:
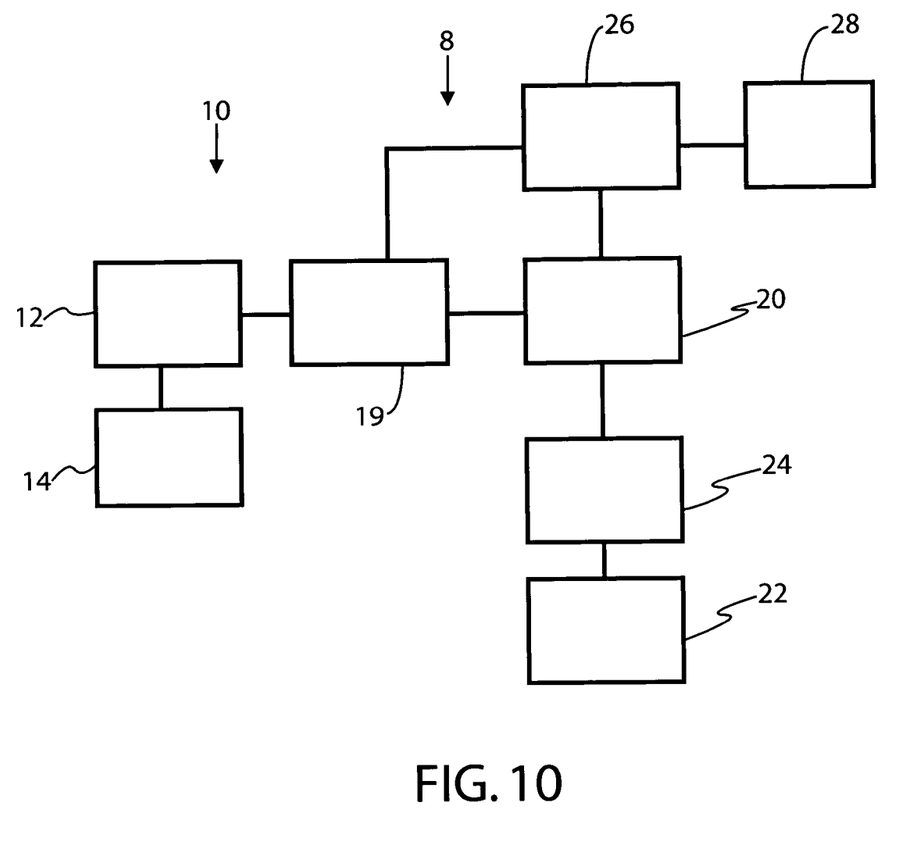
FIG. 10 is a block diagram of the air-wind power system of the present invention.

For example, FIG. 1 illustrates the use of the air-wind power system 8 of the present invention on a passenger automobile 100. In FIG. 2, a cargo transport vehicle 110, such as a semi-tractor trailer is illustrated as employing a plurality of turbines 10. FIG. 3 illustrates the use of the air-wind power system 8 on a recreational vehicle 120, for example such as a bus. In FIG. 4, an air-wind power system 8 is employed on a bicycle 130 having drive means 22 positioned at the rear wheel of the bicycle 130. FIG. 5 represents the use of the air-wind power system 8 on a watercraft 140. In FIG. 6, an airplane 150 utilizes the air-wind power system 8 of the present invention. It may be advantageous to mount one turbine 10 on the nose portion of such airplane 150 to improve its aerodynamics. FIG. 7 illustrates the use of the air-wind power system 8 on a train consist 160. In addition to being mounted on a locomotive 162 of such train consist, the system 8 may be mounted on at least one car 164 within such train consist 160. FIGS. 8 and 9 illustrate the use of the air-wind power system 8 on a golf cart 170 and on a baby stroller 180, respectively.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. An air-wind power system comprising:
   (a) at least one battery mounted within a vehicle and connected to an electrically operable drive means; and
   (b) at least one air-wind powered turbine mounted on such vehicle and electrically coupled to said at least one battery, said at least one air-powered turbine having a propeller fixed in a slanted plane and mounted on a substantially horizontally disposed shaft having an axis thereof disposed substantially perpendicular to a longitudinal axis of such vehicle, whereby a rotational movement of said propeller caused by an air current enables said at least one air-wind powered turbine to generate an electric energy which is stored in said at least one battery and used by such drive means to move such vehicle in a direction of travel.

2. The system, according to claim 1, wherein said at least one battery is a plurality of batteries electrically coupled therebetween.

3. The system, according to claim 1, wherein such drive means includes an electric motor.

4. The system, according to claim 3, wherein such electric motor is positioned adjacent one of a rear portion of such vehicle and a final phase of such drive means.

5. The system, according to claim 1, wherein said system includes an inverter means for connecting said at least one of said at least one air-wind powered turbine and said at least one battery to an electrical grid.

6. The system, according to claim 1, wherein such vehicle is at least one of a passenger automobile, cargo transport vehicle, military vehicle, watercraft, cycle, mobile cart, wheelchair, stroller, aircraft, and locomotive.

7. An air-wind power system comprising:
   (a) an electric motor positioned adjacent one of a rear portion and a final drive system of a vehicle;
   (b) at least one battery mounted within said vehicle and connected to said electric motor; and
   (c) at least one air-wind powered turbine which is mounted on said vehicle's exterior and which is electrically coupled to said at least one battery for generating an electric energy which is stored in said at least one battery and used by said electric motor to move such vehicle in a direction of travel;

wherein said air-powered turbine includes a propeller fixed in a vertical plane and mounted on a horizontally disposed shaft having an axis thereof disposed perpendicular to said direction of travel; and the turbine further comprising a propeller fixed in a slanted plane and mounted on a substantially horizontally disposed shaft having an axis thereof disposed substantially perpendicular to a longitudinal axis of the vehicle.

8. The system, according to claim 7, wherein said propeller includes a plurality of blades.

* * * * *